United States Patent

Johns, Sr. et al.

[15] 3,656,555
[45] Apr. 18, 1972

[54] LAWN EDGER

[72] Inventors: Elvy E. Johns, Sr., 770 19th Street. S.E., Salem, Oreg. 97301; Elvy E. Johns, Jr., 3150 Jack St. N., Salem, Oreg. 97303; Jerry E. Johns, Eastern Washington State College, Cheney, Wash. 99004

[22] Filed: Mar. 27, 1970

[21] Appl. No.: 23,374

[52] U.S. Cl. ................................................172/16, 56/256
[51] Int. Cl. ............................................................A01b 45/00
[58] Field of Search ..................................172/13–18, 36, 172/39, 41, 42, 118, 123, 606, 607, 610, 547, 540, 549; 56/256, 295

[56] References Cited

UNITED STATES PATENTS

| 1,523,729 | 1/1925 | Snyder | 172/17 |
| 2,759,319 | 8/1956 | Smith | 56/256 |
| 3,087,295 | 4/1963 | Grupp | 56/256 |
| 2,507,007 | 5/1950 | Hardersen | 56/256 |
| 2,690,636 | 10/1954 | Besse et al. | 56/256 |
| 2,739,437 | 3/1956 | True | 172/15 |
| 2,612,741 | 10/1952 | McKay | 56/256 |
| 1,489,868 | 4/1924 | Wahl | 56/251 |
| Re.21,274 | 11/1939 | Orr | 172/41 |
| 2,699,605 | 1/1955 | Setter | 172/16 |
| 2,827,748 | 3/1958 | Simpson | 172/14 |
| 2,953,852 | 9/1960 | Dehn | 172/13 |
| 3,086,596 | 4/1963 | Allegretti et al. | 172/15 |

FOREIGN PATENTS OR APPLICATIONS 228,526   4/1959   Australia ..............................172/15

Primary Examiner—Robert E. Pulfrey
Assistant Examiner—C. W. Hanor
Attorney—Berman, Davidson and Berman

[57] ABSTRACT

A lawn edger in which a stationary blade is mounted on a motor carrying frame and revolving blades move past the stationary blade with a shearing action. The revolving blade at its outer end has an extension extending angularly toward the stationary blade so as to trap the material to be cut to prevent it from sliding off of the stationary blade. The revolving blade carriers a digger for opening a narrow trench along side of the walk or object along which edging is being done and a cleaner is positioned so as to clean out dirt from the digger which may have become lodged therein.

5 Claims, 5 Drawing Figures

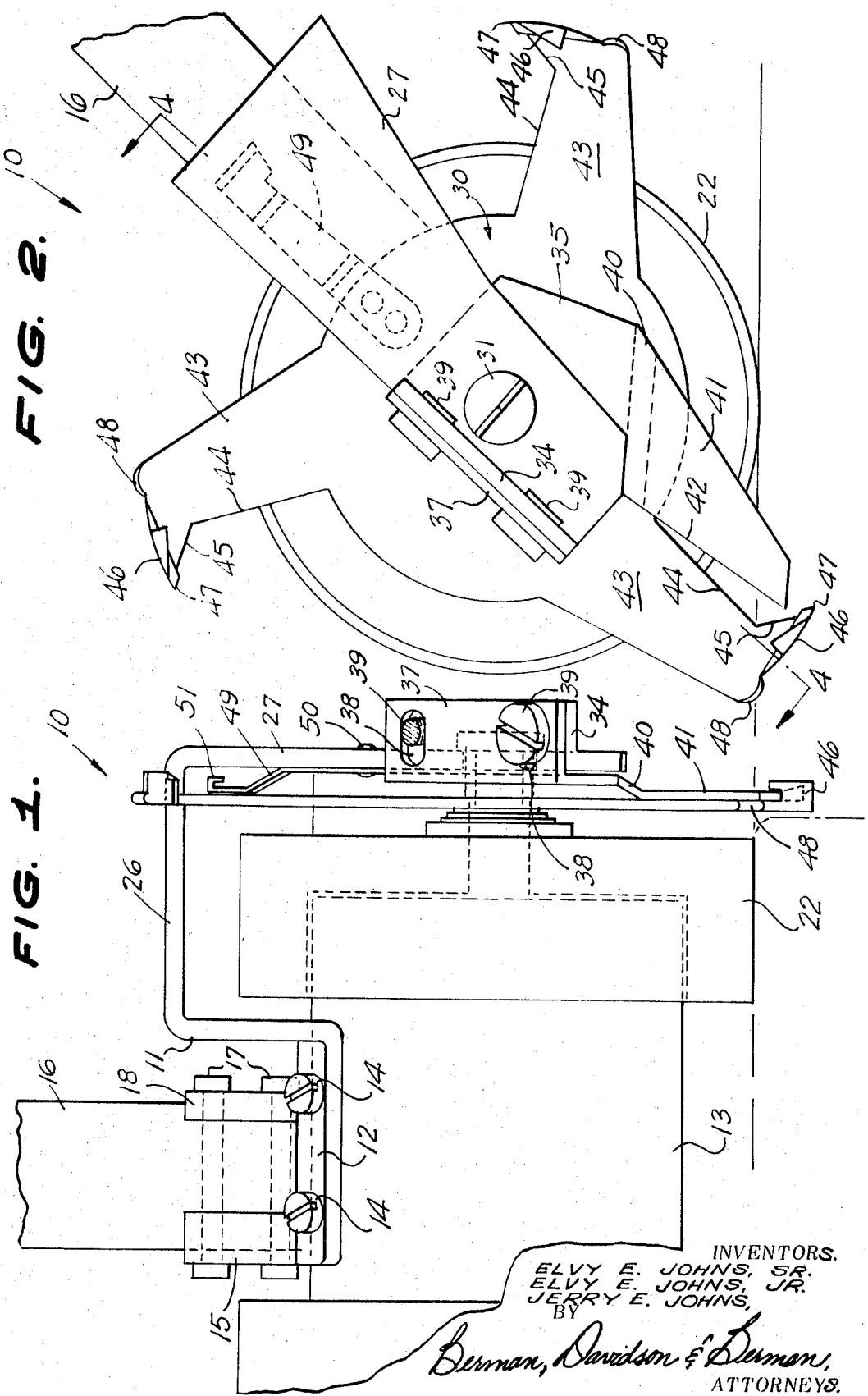

PATENTED APR 18 1972

INVENTORS.
ELVY E. JOHNS, SR.
ELVY E. JOHNS, JR.
JERRY E. JOHNS,
BY
Berman, Davidson & Berman,
ATTORNEYS.

3,656,555

LAWN EDGER

BACKGROUND OF THE INVENTION

1. Field of the Invention

The present invention relates to the edging of lawns alongside of side walks, flower beds and other objects. The edger cuts a trench from the dirt and simultaneously cuts the grass which would otherwise overhang the sidewalk.

2. Description of the Prior Art

Prior art edgers do not provide for simultaneously cutting of the grass and digging a trench with a blade arrangement wherein the cut material is trapped on the stationary cutting blade to prevent its escape without being cut.

SUMMARY OF THE INVENTION

The present invention relates to lawn edgers in which both the overlapping grass as well as the dirt is a narrow trench alongside of a sidewalk are removed.

The primary object of the invention is to provide a lawn edger which produces a sharp clean edge on the turf adjacent a sidewalk or other stationary object by cutting the grass and simultaneously digging a relatively narrow trench.

Other objects and advantages will become apparent in the following specification when considered in light of the attached drawings.

BRIEF DESCRIPTION OF THE DRAWINGS

FIG. 1 is a front elevation of the invention shown partially broken away and in section for convenience of illustration;

FIG. 2 is a side elevation of the invention partially broken away for convenience of illustration;

DESCRIPTION OF THE PREFERRED EMBODIMENT

Figure 3:
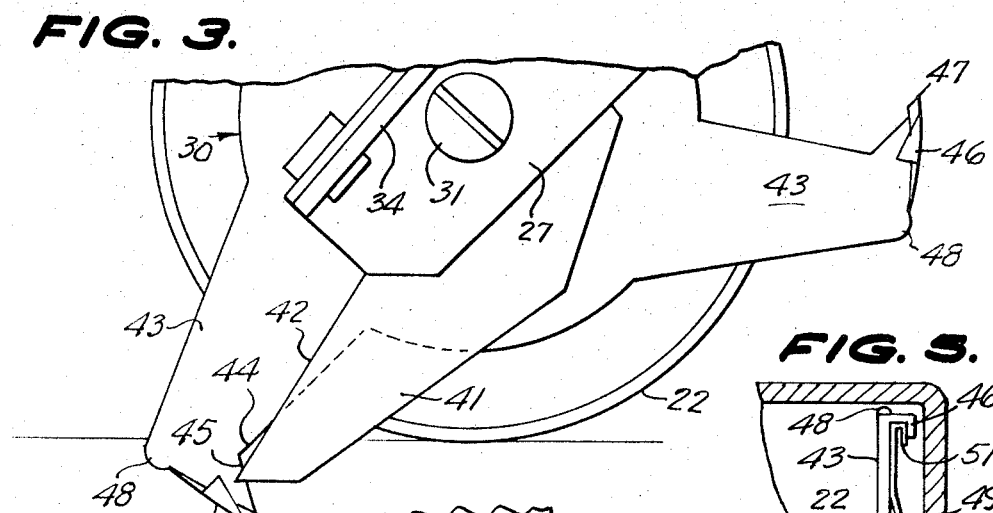
FIG. 3 is a fragmentary side elevation similar to FIG. 2 with the rotary blades in grass trapping position.

Referring now to the drawings in detail wherein like reference characters indicate like parts throughout the several figures, the reference numeral 10 indicates generally a lawn edger constructed in accordance with the invention.

The lawn edger 10 includes a frame 11 having a central portion 12 with an electric motor 13 secured thereto by a pair of bolts 14. An upstanding channel member 15 is integrally secured to the portion 12 and has a wooden handle 16 secured thereto by a pair of bolts 17. A channel plate 18 is arranged in opposed relation to the channel plate 15 and the bolts 17 pass therethrough clamping the handle 16 therebetween.

The electric motor 13 has a pair of fixed shafts 19, 20 projecting axially from opposite ends thereof with the shaft 19 being hollow to permit the armature shaft 21 to extend therethrough. A wheel 22 is journalled on the shaft 19 and secured thereon by a spring washer 23. A wheel 24 is mounted on the shaft 20 and secured thereon by a spring washer 25.

Figure 4:
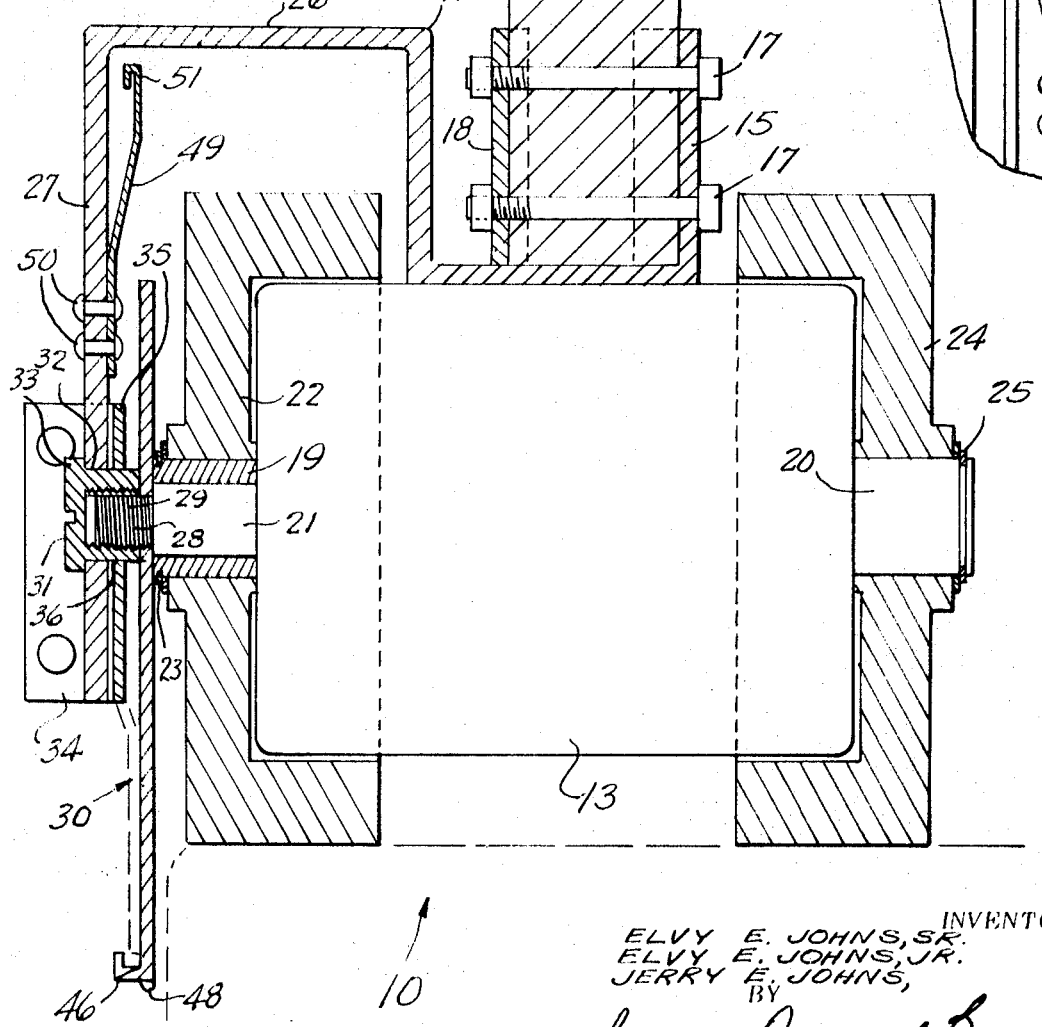
FIG. 4 is a transverse cross section taken along the line 4—4 of FIG. 2 looking in the direction of the arrows with parts broken away for convenience of illustration.

The frame 11 has an extension 26 which projects over the wheel 22 and carries an end plate 27 which extends beyond the shaft 19 outboard of the wheel 22. The armature shaft 21 has a reduced threaded end portion 28 with a flattened side 29 as can be seen in FIG. 4. A rotating cutter blade generally indicated at 30 is shaped to fit the threaded reduced end portion 28 of the shaft 21 and flattened portion 29 thereof so that when the cutter blade 30 is mounted on the shaft extension 28 it cannot rotate thereon. A nut 31 of generally cylindrical shape extends through a bore 32 in the plate 27 and screws on to the threaded extension 28 of the shaft 21. A peripheral flange 33 on the nut 31 engages the outer face of the plate 27. The plate 27 has a perpendicular flange 34 projecting outwardly from the forward lower edge thereof. A stationary cutter blade 35 has a bore 36 which engages over the nut 31 and is provided with a flange 37 which extends perpendicularly parallel to the flange 34 and in contact with the flange 34. The flange 37 has a pair of elongate openings 38 through which bolts 39 extend, being threaded into the flange 34. The flange 37 is adjustable on the flange 34 axially of the electric motor 13 by loosening the bolts 39 and sliding the flange 37 on its elongate openings 38 and then tightening the bolts 39. The cutter blade 35 is offset inwardly at 40 and has a lower portion 41 which projects downwardly beyond the periphery of the wheels 22, 24. The lower portion 41 of the cutter blade 35 is in a plane perpendicular to the axis of the electric motor 13 and has a cutting edge 42 which extends downwardly and forwardly at an angle to the perpendicular.

The rotating cutter blade 30 has a plurality of cutting elements 43 projecting radially outwardly therefrom. The cutting elements 43 each have a cutting edge 44 which slope away from the direction of rotation so as to meet the cutting edge 42 in a scissors-like motion as the cutter 30 is rotated. A smooth, rounded edge 45 is formed on each of the cutting elements 43 and projects in the direction of rotation at an angle to the cutting edge 44 so as to form a V with the cutting edge 42 to trap grass on the cutting edge 42 to prevent it from sliding outwardly and away from the cutting edge 44.

An arcuate digging tooth 46 is formed on the outer end of each of the cutter elements 43 and extends perpendicularly to the cutter element 43. The digger tooth 46 has a cutting edge 47 on its leading edge and is arranged to dig a relatively narrow trench alongside of a sidewalk where the lawn edger 10 is in use.

A bumper 48 is formed on the blade portion 43 so as to extend radially outwardly from the shaft 21 beyond the digger 46 and cutting edge 47 to protect the digger 46 and cutter edge 47 by striking any obstruction such as a stone, sidewalk or the like before the cutting edge 47 would come in contact therewith itself, because of the velocity of rotation of the cutter blade, stopping the forward motion of the edger or permitting the operator to stop the forward motion of the edger 10.

Figure 5:
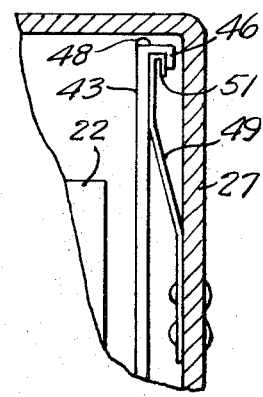
FIG. 5 is a fragmentary cross sectional detail illustrating the cleaning action on the digging blade.

A cleanout blade 49 is secured to the plate 27 by rivets 50 and is positioned offset from the blade 27 as can be seen in FIG. 4. The upper end 51 of the cleanout blade 49 is formed into a relative U-shape to engage inside the cutter 46 as shown in FIG. 5 as the cutter passes the cleanout blade 49 to remove any dirt that may have become lodged in the cutter 46 during trenching. The channel formed between edge 45 and tooth 46 is wider at its trailing edge so that the soil and debris does not wedge therebetween and is easily cleaned out.

The cutter blades 43 and the stationary cutter blade 41 are each hollow ground so that only the cutting edges thereof come in contact and the stationary cutter 35 is adjustable on the frame 11 to adjust the shear between the stationary cutter blade edge 42 and the movable cutter edges 44. The leading portion of edge 45 is not sharp so it has no cutting action. Due to the slope of edge 45 the grass is forced back to the cutting edges 42 and 44 where it is locked in position and cut. Each blade of grass is thus moved to the same relative position in regard to the trim line when it is cut. If, after cutting, the natural elasticity of the grass blade moves it to a position where it would extend beyond this trim line, a second or third trimming cut by the plural cutting elements of rotating cutter blade 30 as the mower moves forward will leave each grass blade cut to such length that in its normal growing position, none will extend beyond the trim line of the lawn edge.

Having thus described the preferred embodiments of the invention, it should be understood that numerous structural modifications and adaptations may be resorted to without departing from the spirit of the invention.

What is claimed is:

1. A lawn edger comprising a frame, a motor mounted on said frame, a drive shaft on said motor extending transversely of said frame, a stationary cutter blade carried by said frame, a straight cutting edge on said cutter blade extending radially of said shaft, a rotary cutter blade carried by said shaft and cooperating in a shear action with said stationary cutter blade, said rotary cutter blade having a leading edge and an outer noncutting edge angularly related to slope from the apex of their meeting angle toward said stationary blade to trap grass between said blades for shearing thereby, and an inwardly opening generally U-shaped digger means mounted on the outer end of said rotary cutter blade for digging a relatively narrow trench along the edge of the lawn.

2. A device as claimed in claim 1 wherein a bumper is provided on said rotary cutter blade extending radially beyond said digger means for protecting said digger means from contact with rocks and concrete.

3. A device as claimed in claim 1 wherein a stationary means is mounted on said frame for cleaning dirt from said U-shaped digger means upon rotation of said cutter blade.

4. A device as claimed in claim 1 wherein ground engaging wheels are journalled on opposite ends of said motor and a handle is removably secured to said frame for actuation of said lawn edger.

5. A device as claimed in claim 1 wherein said U-shaped digger means includes a sharpened tooth projecting perpendicularly from the outer end portion of said rotary cutter blade.

* * * * *